United States Patent
Hamabata et al.

(10) Patent No.: US 7,977,908 B2
(45) Date of Patent: Jul. 12, 2011

(54) NUMERICAL CONTROLLER WITH ABNORMAL MOTOR DECELERATION STOP CONTROL MEANS

(75) Inventors: Tsutomu Hamabata, Yamanashi (JP); Hiroshige Ando, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 380 days.

(21) Appl. No.: 12/071,970

(22) Filed: Feb. 28, 2008

(65) Prior Publication Data

US 2008/0218115 A1    Sep. 11, 2008

(30) Foreign Application Priority Data

Mar. 8, 2007  (JP) ................................. 2007-058246

(51) Int. Cl.
G05B 19/18    (2006.01)
(52) U.S. Cl. ........................................ 318/569; 318/600
(58) Field of Classification Search .................. 318/569, 318/600, 461, 625, 601
See application file for complete search history.

(56) References Cited

U.S. PATENT DOCUMENTS

| | | | | |
|---|---|---|---|---|
| 3,806,788 A | * | 4/1974 | Ullmann et al. | 318/601 |
| 4,484,413 A | * | 11/1984 | Yamamoto et al. | 451/5 |
| 4,506,321 A | * | 3/1985 | Comstock et al. | 700/69 |
| 4,709,509 A | * | 12/1987 | Yoneda et al. | 451/5 |
| 4,970,449 A | * | 11/1990 | Kawamura et al. | 318/569 |
| 5,144,213 A | * | 9/1992 | Sasaki et al. | 318/569 |
| 5,473,542 A | | 12/1995 | Olomski et al. | |
| 6,937,942 B2 | * | 8/2005 | Lee | 702/34 |
| 2006/0022629 A1 | * | 2/2006 | Aoyama et al. | 318/569 |
| 2007/0021861 A1 | | 1/2007 | Murata et al. | |

FOREIGN PATENT DOCUMENTS

| | | |
|---|---|---|
| EP | 0 658 832 | 6/1995 |
| EP | 1 304 604 | 4/2003 |
| JP | 4-152091 | 5/1992 |
| JP | 5-146940 | 6/1993 |
| JP | 2007-026171 | 2/2007 |
| WO | 2004/059494 | 7/2004 |

OTHER PUBLICATIONS

Japanese Notice of Reasons for Rejection mailed Jul. 8, 2008 issued in Japanese Application No. 2007-058246 (including a partial translation thereof).
European Search Report mailed Sep. 3, 2009 issued in European Patent Application No. 08152284.

* cited by examiner

*Primary Examiner* — Rina I Duda
(74) *Attorney, Agent, or Firm* — Drinker Biddle & Reath LLP

(57) ABSTRACT

While a numerical controller is operating, an abnormality of a numerical control section is detected. In response to an abnormality detection signal, a motor deceleration stop control circuit of a servo section is actuated to perform speed control with a speed command "0", thereby stopping a motor. If an actual speed of the motor becomes not higher than a preset speed, an off command signal for turning off a DO signal is delivered to a PMC section. In response to this off command signal, the PMC section turns off a brake control DO or all DO signals. Thus, a brake device that is attached to the motor is activated to brake the motor.

2 Claims, 1 Drawing Sheet

NUMERICAL CONTROLLER WITH ABNORMAL MOTOR DECELERATION STOP CONTROL MEANS

BACKGROUND OF THE INVENTION

1. Field of the Invention

The present invention relates to a numerical controller with abnormal motor deceleration stop control means, and more particularly, to a technique for urgently stopping a motor of a machine controlled by a numerical controller in case of occurrence of an abnormality at a numerical control section of the numerical controller.

2. Description of the Related Art

A numerical controller is composed of a servo section, a programmable machine controller section (hereinafter referred to as PMC section), and a numerical control section. The servo section controls a motor attached to a machine that is controlled by the numerical controller. The PMC section controls DI/DO signals (input/output signals) for the machine. The numerical control section outputs commands to and exchanges data with the servo section and the PMC section.

FIG. 2 is a schematic diagram showing a system including a conventional numerical controller 10' and a machine 24 that is controlled by the controller 10'. A servo section 15 controls the position, speed, and current of a motor 22 for each axis of the machine 24 in response to a move command from a numerical control section 11. Further, a PMC section 16 enables an I/O control section (hereinafter referred to as I/O unit) 23 to control DI/DO signals for the machine 24. In the case where a movable axis of the machine moves under the influence of an external force, such as the gravity, in particular, the motor that drives the movable axis is provided with a brake device. This brake device can be on/off-controlled by the I/O unit 23 based on a DO signal from the PMC section 16. Further provided is an abnormality detection circuit 14 that detects an abnormality of the numerical control section 11.

The numerical control section 11 executes a control program, thereby distributing a move command to the servo section 15 that drivingly controls the motor for each axis of the machine 24. Based on this move command and position and speed feedback signals fed back from position and speed detectors (not shown), the servo section 15 performs position and speed feedback control and current feedback control and outputs a drive command to an amplifier 21. The amplifier 21 performs PWM control or the like and drivingly controls the motor 22. On the other hand, the PMC section 16 transmits and receives DI/DO signals through the I/O unit 23, and causes the I/O unit 23 to on/off-control sensors and actuators attached to the machine 24, peripheral equipment, etc. As mentioned before, the brake device that is attached to the motor 22 is also on/off-controlled by the DO signal (output signal).

In the numerical controller 10', as described above, the servo section 15 drivingly controls the motor that drives the movable axis of the machine, and the PMC section 16 receives signals from the various sensors, on/off-controls the various actuators and the peripheral equipment, and drivingly controls the machine 24.

If the abnormality detection circuit 14 detects an abnormality of the numerical control section 11 while the numerical controller 10' is operating, it outputs an abnormality detection signal to the servo section 15. On receipt of this abnormality detection signal, the servo section 15 stops a drive command signal for the amplifier 21. When the drive command signal is stopped, the amplifier 21 interrupts power supply to the motor 22. When the power supply to the motor 22 is interrupted, dynamic braking is applied by the motor 22, whereupon a movement of a moving part is stopped.

On the other hand, the PMC section 16 periodically exchanges data with the numerical control section 11. If the exchange of the data with the numerical control section 11 is interrupted for a fixed period of time or longer, it is concluded that an abnormality has occurred, and all the DO signals (output signals) are turned off. When the DO signals are turned off, the brake device that is attached to the motor 22 is worked to brake the motor 22.

The conventional numerical control system performs emergency stop control such as the aforementioned one if an abnormality occurs in the numerical control section 11.

In order to ensure an operator's safety when the numerical control system is urgently stopped, moreover, a sensor is provided for detecting a dangerous state, if any, of the operator. In response to a signal from the sensor, the motor is cut off from the power supply and stopped. According to a known invention (see Japanese Patent Application Laid-Open No. 5-146940), in this case, the interruption of the power supply is detected by alarm detection means and an alarm output is delivered. If the power supply to the motor is interrupted in response to the signal from the sensor, the alarm detection means is inactivated by the sensor signal lest an alarm be output, whereby the recovery of the system is facilitated.

In the prior art technique described above, the rotation of the motor and the movement of the moving part that is driven by the motor are stopped by interrupting the power supply to the motor in case of an emergency stop. In stopping the motor rotation and the movement of the moving part when an abnormality occurs during a high-speed movement, therefore, the motor power supply is only interrupted, so that the motor and the moving part coast for long distances.

If the moving part is a gravity axis or the like that is vertically moved by an external force other than a force from the motor, moreover, it inevitably moves under the influence of the gravity or any other external force even when the power supply to the motor is interrupted. Accordingly, the brake device is attached to the motor that drives the moving part so that the movement of the moving part can be stopped by braking the motor by means of the brake device when the power supply to the motor is interrupted, as mentioned before.

In the conventional method described above, however, the operation for stopping the motor and the timing for a brake signal are not controlled. If the output of the brake signal is delayed behind the motor stop, therefore, the moving part, including the gravity axis, unfavorably drops and moves before it is braked.

SUMMARY OF THE INVENTION

The object of the present invention is to provide a numerical controller capable of stopping a motor and a moving part in a short time when an abnormality occurs in a numerical control section and controlling the timing for braking the motor.

A numerical control according to the present invention comprises a servo section for controlling a motor, a programmable machine controller section for controlling DI/DO signals for a machine, a numerical control section which issues a command to the servo section and exchanges data with the programmable machine controller section, abnormality detection means for detecting an abnormality of the numerical control section, and motor deceleration stop control means which is provided in the servo section and decelerates and stops the motor on receipt of an abnormality detection signal for the numerical control section from the abnormality detection means, whereby the motor is subjected to deceleration control and stopped quickly when an abnormality occurs in the numerical control section.

The motor deceleration stop control means may be provided with signal delivery means which delivers a signal for turning off a DO signal to the programmable machine controller section when a fed-back actual speed of the motor becomes not higher than a preset speed, and the programmable machine controller section may be provided with DO signal turning-off means which turns off the DO signal on receipt of the signal for turning off the DO signal from the signal delivery means.

The programmable machine controller section may be provided with means which receives the abnormality detection signal from the abnormality detection means and turns off the DO signal.

The motor may be provided with a brake device such that the brake device is activated for braking when the DO signal turning-off means in the programmable machine controller section is actuated.

In the numerical controller according to the present invention, having the configuration described above, the motor and the moving part driven by the motor can be stopped in a short time by controlling the motor when the abnormality of the numerical control section is detected. Further, the DO signal can be turned off simultaneously with the deceleration stop of the motor. In the case of the motor for driving the moving part that moves under the influence of an external force, such as the gravity, the motor can be braked by the brake device at the same time as the stop of its rotation. Further, braking can also be applied by the brake device the moment the deceleration stop control is performed for the motor.

BRIEF DESCRIPTION OF THE DRAWINGS

The above and other objects and features of the present invention will be apparent from the ensuing description of embodiments with reference to the accompanying drawings, in which.

DETAILED DESCRIPTION OF THE PREFERRED EMBODIMENTS

Figure 1:
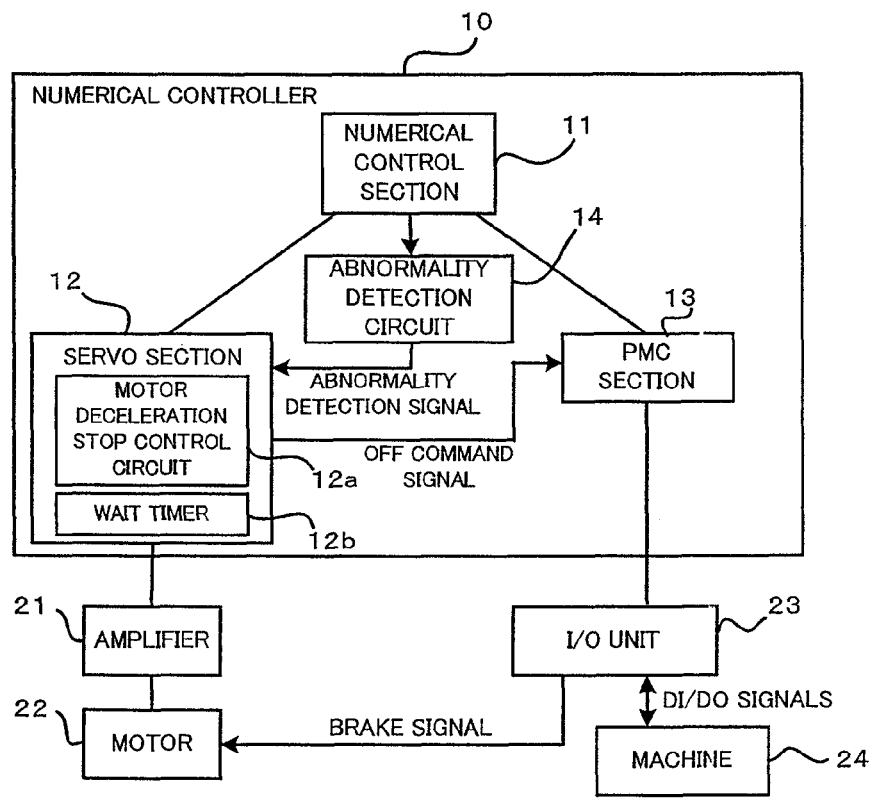
FIG. 1 is a schematic diagram showing a numerical control system including a numerical controller according to one embodiment of the invention and a principal part of a machine controlled by the numerical controller.
Figure 2:
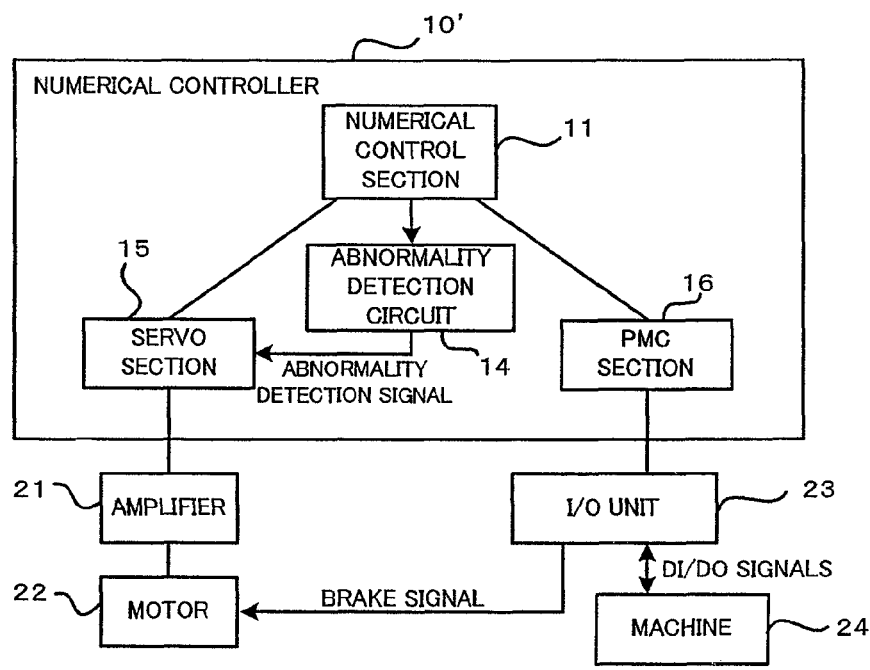
FIG. 2 is a schematic diagram showing a numerical control system including a conventional numerical controller and a principal part of a machine controlled by the numerical controller.

FIG. 1 is a diagram showing a numerical control system including a numerical controller according to one embodiment of the present invention, which is provided with control means for decelerating and stopping a motor in case of abnormality of a numerical control section, and a principal part of a machine that is controlled by the numerical controller. In FIG. 1, the same reference numerals are used for component parts identical with those in the prior art example shown in FIG. 2.

A numerical controller 10 is composed of a numerical control section 11, a servo section 12, a PMC section 13, and an abnormality detection circuit 14 for detecting an abnormality of the numerical control section 11. The numerical controller 10 according to the present embodiment differs from the conventional numerical controller 10' shown in FIG. 2 only in that the servo section 12 is provided with a motor deceleration stop control circuit 12a and a wait timer 12b, and that the PMC section 13 turns off a brake control DO or all DO signals in response to an off command signal delivered from the servo section 12.

The numerical control section 11 executes a control program, thereby distributing a move command to the servo section 12 that drivingly controls a motor 22 for each axis of a machine 24. Based on this move command and position and speed feedback signals fed back from position and speed detectors (not shown) that are attached to the motor 22 or the like, on the other hand, the servo section 12 performs position and speed feedback control and current feedback control and outputs a drive command to an amplifier 21. The amplifier 21 performs PWM control or the like and drivingly controls the motor 22.

On the other hand, the PMC section 13 receives signals (DI signals) from sensors or the like that are attached to the machine 24 through an I/O unit 23, delivers output signals (DO signals) to actuators, peripheral equipment, etc., and on/off-controls them. As mentioned before, brake signals of the brake device that is attached to the motor are also on/off-controlled by the DO signals.

Although this normal-state operation is performed in the same manner as the conventional one, a difference lies in the operation that is performed when an abnormality of the numerical control section 11 is detected by the abnormality detection circuit 14.

If the abnormality detection circuit 14 detects an abnormality of the numerical control section 11 while the numerical controller 10 is operating, it outputs an abnormality detection signal to the servo section 12. On receipt of this abnormality detection signal, in the servo section 12, the wait timer 12b is started, and the motor deceleration stop control circuit 12a is activated. Based on the move command from the numerical control section 11, the operation is switched from the position and speed feedback control, having so far been being executed, over to the operation of the motor deceleration stop control circuit 12a that involves only speed feedback control based on a speed command "0". Before the abnormality detection signal is detected, the position and speed feedback control is performed, and the motor 22 rotates at the commanded speed. When the abnormality detection signal is input to the servo section 12, however, the speed command is set to "0", and the speed feedback control is performed. Even though the speed command is "0", the motor 22 and a moving part driven by the motor 22 continue to move, failing to stop immediately. In consequence, a speed deviation increases, and the motor 22 is subjected to a torque that causes a movement in the opposite direction, whereupon the motor 22 and the moving part are rapidly decelerated and stopped. Thus, the motor 22 is subjected to deceleration control and stopped quickly. Further, the motor deceleration stop control circuit 12a monitors an actual speed fed back from the speed detector that is attached to the motor 22. If the actual speed becomes not higher than a preset speed, the control circuit 12a delivers an off command for turning off the DO signals to the PMC section 13.

The PMC section 13 is provided with means which turns off the brake control DO or all the DO signals when receiving this off command signal. When the DO signals are turned off, the brake signals of the brake device that is attached to the motor 22 by means of the I/O unit 23 are also turned off, whereupon the motor 22 is braked to be stopped and locked. By doing this, the moving part on which the gravity acts can be securely prevented from dropping at the time of emergency stop. Conventionally, the motor is coasted and stopped by dynamic braking. According to the present invention, in contrast with this, the rotation of the motor 22 is decelerated and stopped by speed control. Thus, the motor 22 and the moving part driven by the motor can be stopped within the shortest distance and the shortest time. When a predetermined time is measured by the wait timer 12*b*, the servo section 12 stops the signal delivery to the amplifier 21, whereupon the emergency stop operation to cope with the detected abnormality of the numerical control section 11 terminates.

The off command signal is output by the motor deceleration stop control circuit 12*a* of the servo section 12 when the actual speed of the motor 22 becomes not higher than the preset speed. Thus, if the preset speed is "0", braking is applied when the actual speed of the motor 22 becomes "0". The time measured by the wait timer 12*b* is set to a time duration a little longer than a period of time during which an abnormality is detected while the motor is rotating at its maximum speed and the motor is stopped by speed feedback with a command for the speed "0".

Thus, the servo section 12 that drivingly controls the motor 22 directly issues a command to the PMC section 13 to turn off the DO signals. Therefore, the operation for stopping the motor 22 and the timing for braking can be delicately controlled, so that the moving part and the like on which the gravity acts can be prevented from dropping. Even during a high-speed movement, moreover, the distance the motor and the moving part move from the occurrence of an abnormality until their stopping can be shortened.

The motor deceleration stop control circuit 12*a* and the wait timer 12*b* that are provided in the servo section 12 described above may each be composed of a dedicated hardware circuit. Normally, however, the servo section 12 is composed of a processor, memory, etc., and executes the position and speed feedback control by software processing. Therefore, the control of the motor deceleration stop control circuit 12*a* and the wait timer 12*b* is also executed by software processing. Thus, when the abnormality detection signal is input to the servo section 12, the processor of the servo section 12 executes the speed feedback control based on the speed command "0" in place of the position and speed feedback control and drives the motor 22.

In the embodiment described above, the off command signal for turning off the DO signals is delivered from the servo section 12 to the PMC section 13. Alternatively, however, the abnormality detection signal output from the abnormality detection circuit 14 may also be input to the PMC section 13 so that it serves as an off command signal for turning off the DO signals. In response to this off command signal, the PMC section 13 turns off the brake control DO or all the DO signals. In this case, the servo section 12 performs the speed feedback control and deceleration stop control for the motor 22 so that the speed is "0". Further, the brake device brakes the motor 22 to arrest its rotation. In consequence, the rotation of the motor 22 and the movement of the moving part that is driven by the motor 22 are stopped quickly. If the motor rotation and the movement of the moving part are expected to be stopped as soon as possible when an abnormality of the numerical control section 11 is detected, a method should only be employed such that they are quickly stopped by synchronizing the deceleration stop control by the motor deceleration stop control circuit 12*a* of the servo section 12 with the braking by the brake device.

What is claimed is:

1. A numerical controller comprising:
   a servo section for controlling a motor;
   a programmable machine controller section for controlling DI/DO signals for a machine;
   a numerical control section which issues a command to the servo section and exchanges data with the programmable machine controller section;
   abnormality detection means for detecting an abnormality of the numerical control section; and
   motor deceleration stop control means which is provided in the servo section and decelerates and stops the motor so that the motor is subjected to a torque that causes a movement in the opposite direction based on speed feedback control, on receipt of an abnormality detection signal, indicating abnormality of the numerical control section, from the abnormality detection means,
   wherein said motor deceleration stop control means is provided with signal delivery means which delivers a signal for turning off a DO signal to the programmable machine controller section when an actual speed of the motor becomes not higher than a preset speed, and said programmable machine controller section is provided with means which receives the signal for turning off the DO signal from the signal delivery means and which turns off the DO signal for a brake device, thereby activating the brake device.

2. The numerical controller according to claim 1, wherein the programmable machine controller section is provided with means which receives the abnormality detection signal from the abnormality detection means and turns off a DO signal for a brake device, thereby activating the brake device.

* * * * *